United States Patent
Yoshinari et al.

(10) Patent No.: US 6,414,998 B1
(45) Date of Patent: Jul. 2, 2002

(54) METHOD AND APPARATUS FOR INSERTING AN IMAGE MATERIAL

(75) Inventors: Hiromi Yoshinari; Takao Suzuki, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/014,279

(22) Filed: Jan. 27, 1998

(51) Int. Cl.$^7$ ................................................. H04N 7/12
(52) U.S. Cl. ................................................. 375/240.25
(58) Field of Search ........................... 375/240, 240.25, 375/241, 242, 342, 343, 349; 348/9, 432, 426, 473, 584, 464, 423; 370/487, 94.1; H04N 7/12

(56) References Cited

U.S. PATENT DOCUMENTS 5,534,944 A * 7/1996 Egawa et al. ................ 348/584
5,687,257 A * 11/1997 Paik et al. .................... 382/239
5,859,660 A * 1/1999 Perkins et al. ................. 348/9
6,137,834 A * 10/2000 Wine et al. ................... 375/240
6,229,851 B1 * 5/2001 Cotton .................... 375/240.25

* cited by examiner

Primary Examiner—Nhon Diep
(74) Attorney, Agent, or Firm—Frommer Lawrence & Haug LLP; William S. Frommer

(57) ABSTRACT

A method and an apparatus for supplying an image material are provided for compressing and coding the image material, generating a coded bit stream meeting a condition requested by a virtual buffer verifier, and adding information of a splice point when splicing the coded bit stream. The method is executed to take the steps: compressing and coding the image material; compressing and coding the same image material as the image material compressed and coded at the first step; controlling a bit rate of a coded bit stream composed by compressing and coding the image material, for the second compressing and coding step, based on the information about an occurrence amount of bits derived as a result of compressing and coding at the first compressing and coding step and controlling generation of the coded bit stream so that the virtual buffer verifier is made to have a target buffer occupancy at the splice point.

15 Claims, 12 Drawing Sheets

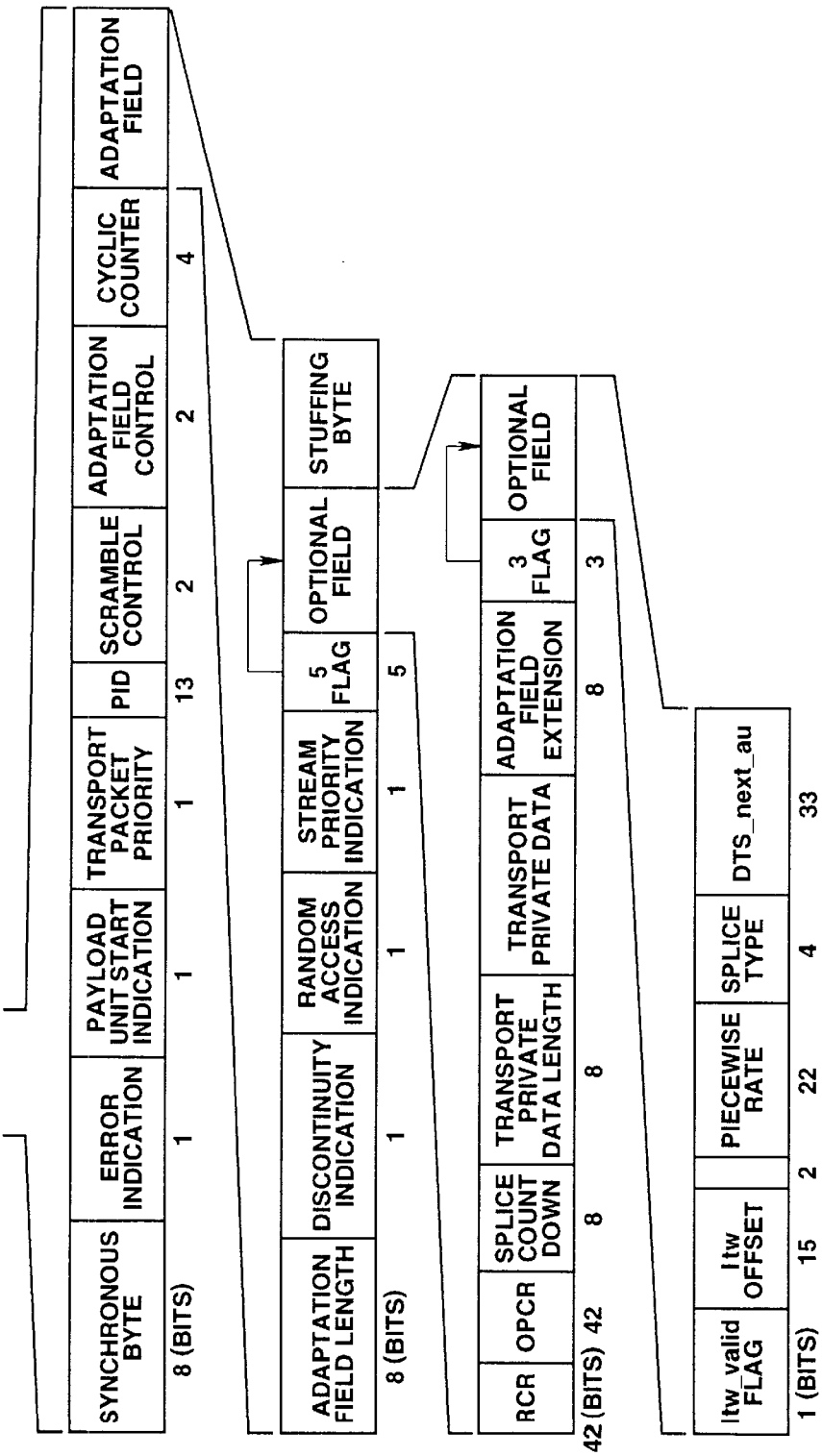

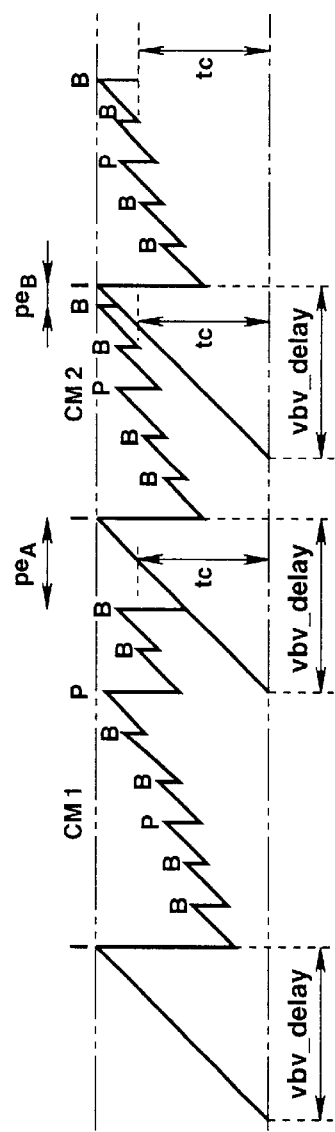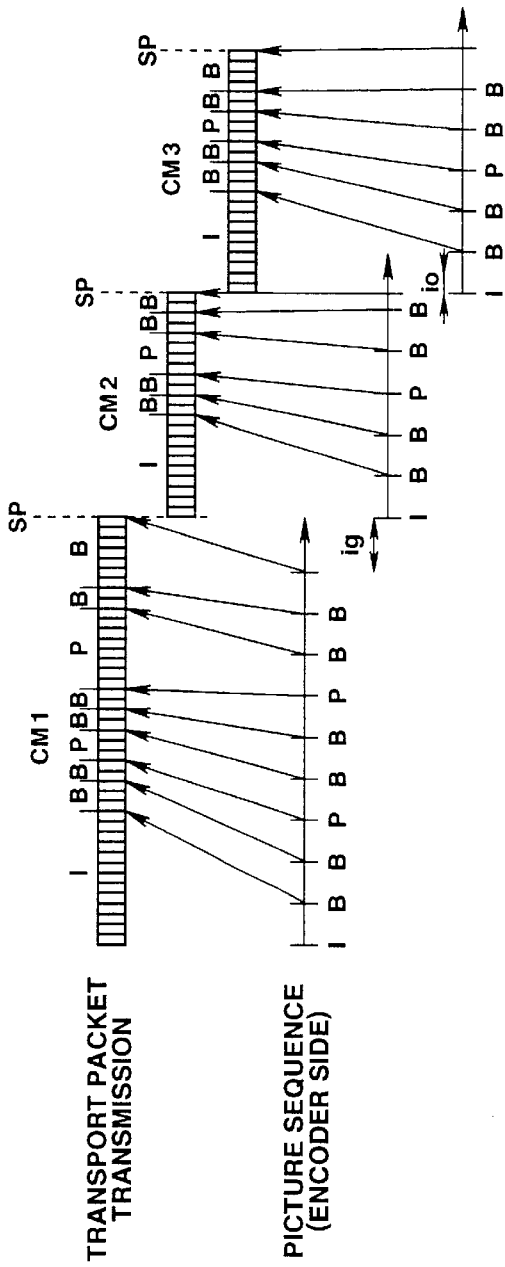
FIG.2A  VBV BUFFER (DECODER SIDE)
FIG.2B  TRANSPORT PACKET TRANSMISSION / PICTURE SEQUENCE (ENCODER SIDE)

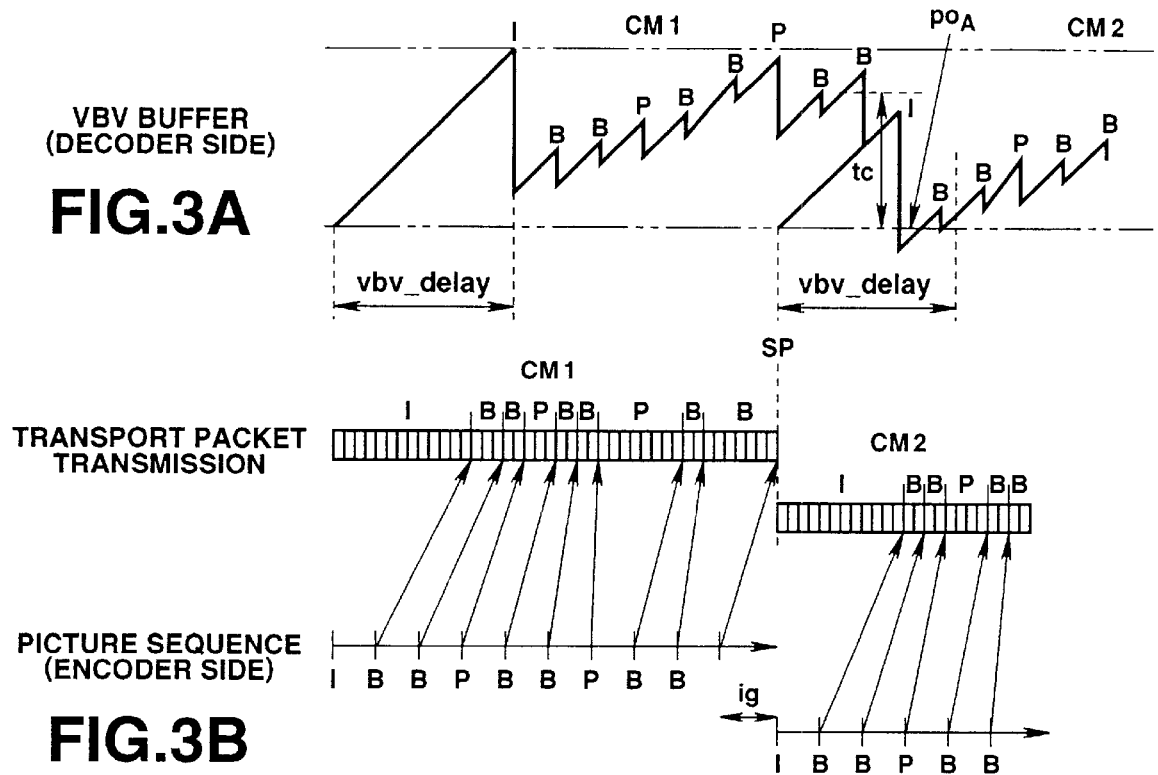
FIG.3A VBV BUFFER (DECODER SIDE)
FIG.3B TRANSPORT PACKET TRANSMISSION / PICTURE SEQUENCE (ENCODER SIDE)
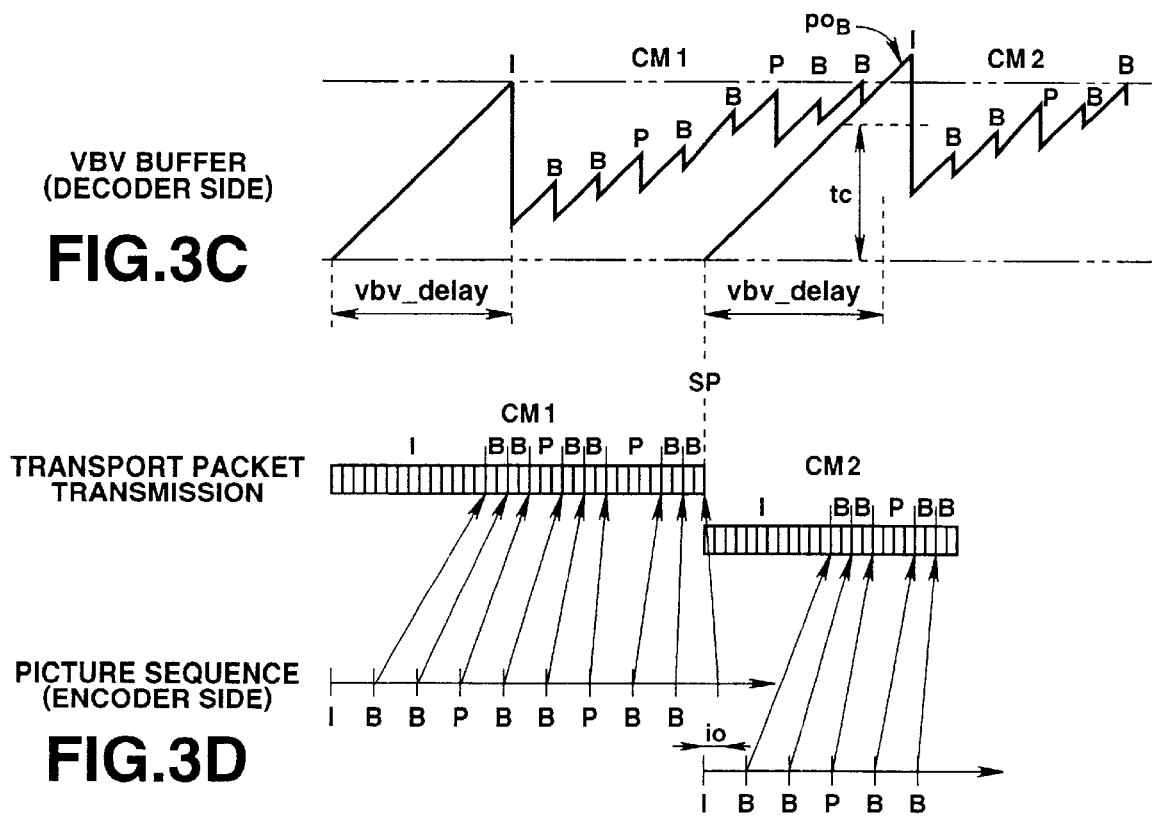
FIG.3C VBV BUFFER (DECODER SIDE)
FIG.3D TRANSPORT PACKET TRANSMISSION / PICTURE SEQUENCE (ENCODER SIDE)

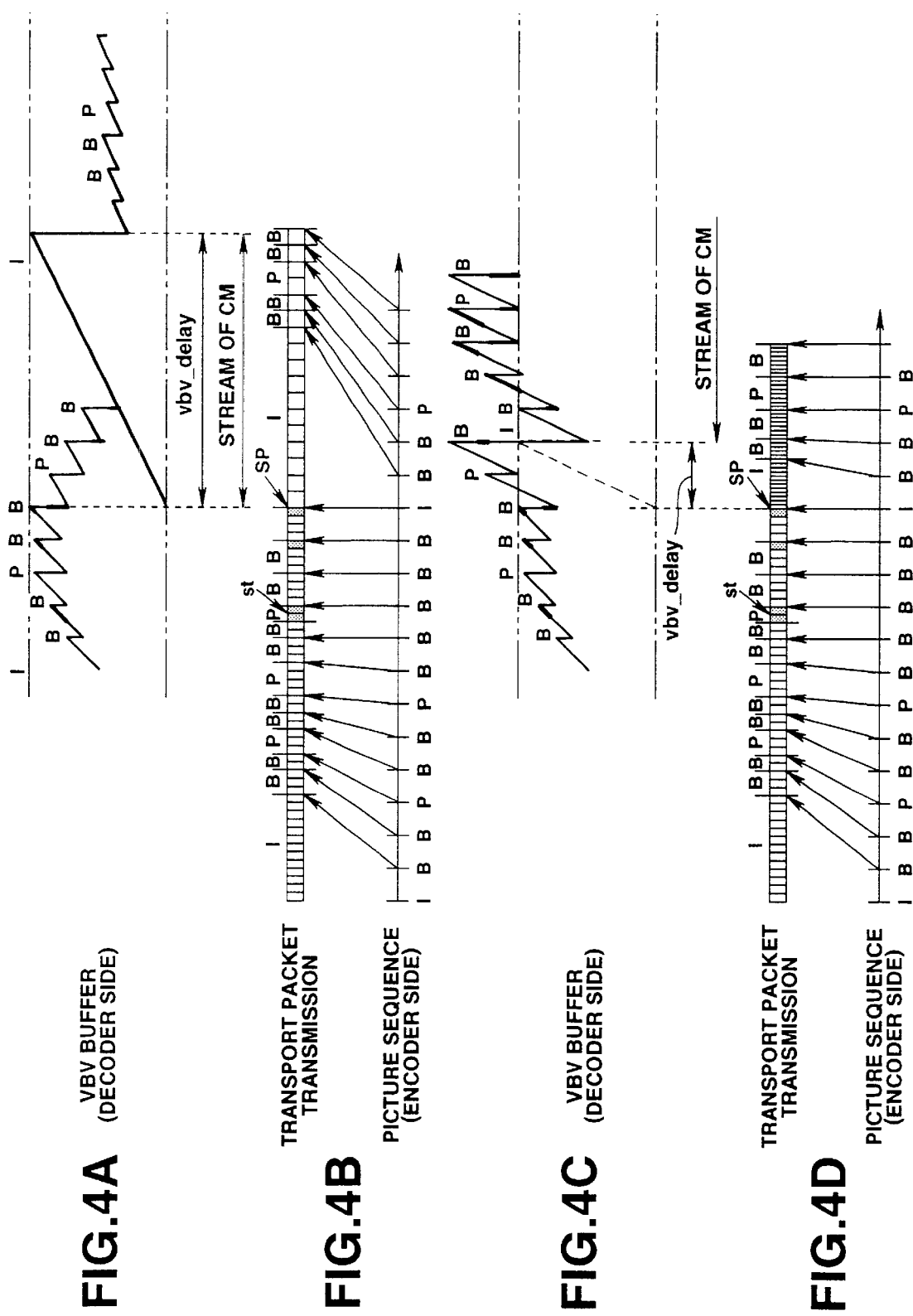

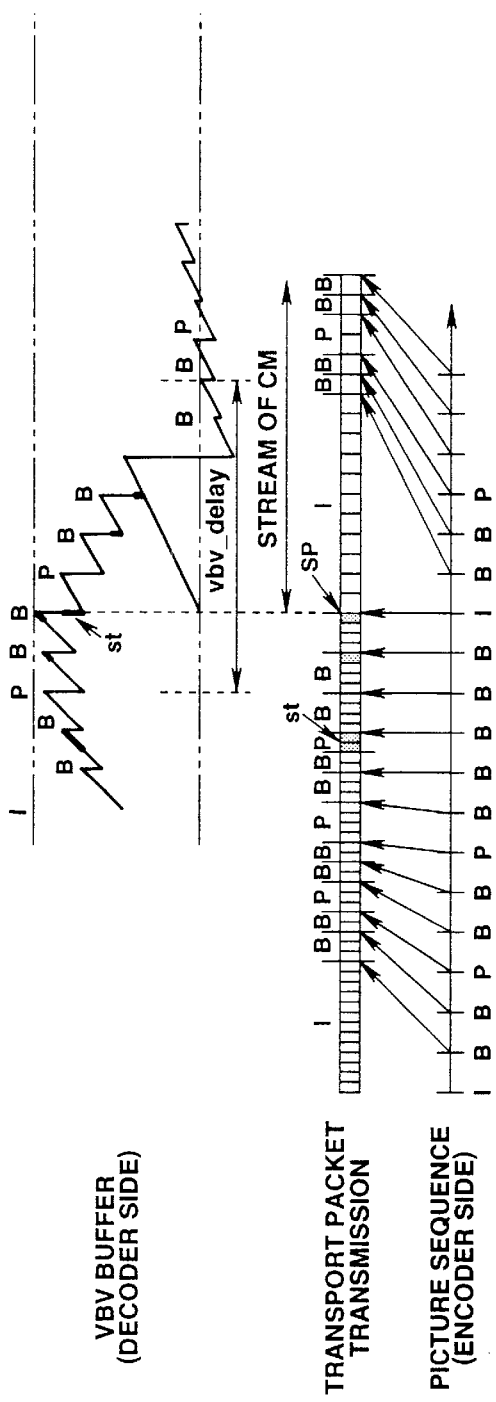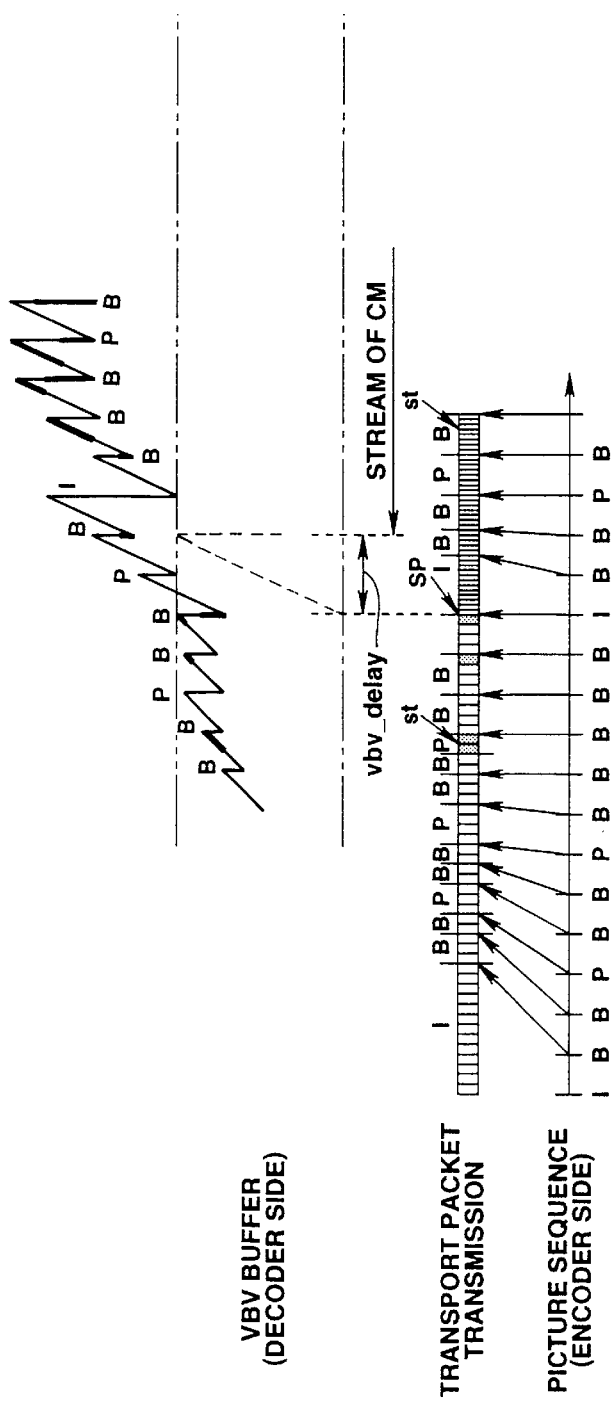
FIG.5A FIG.5B FIG.5C FIG.5D

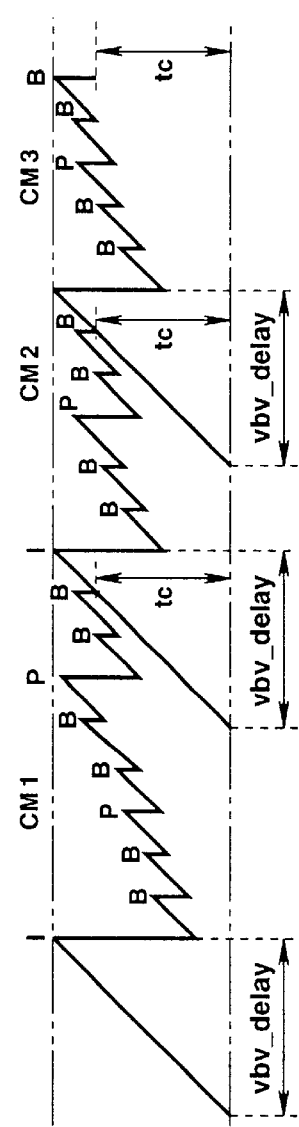
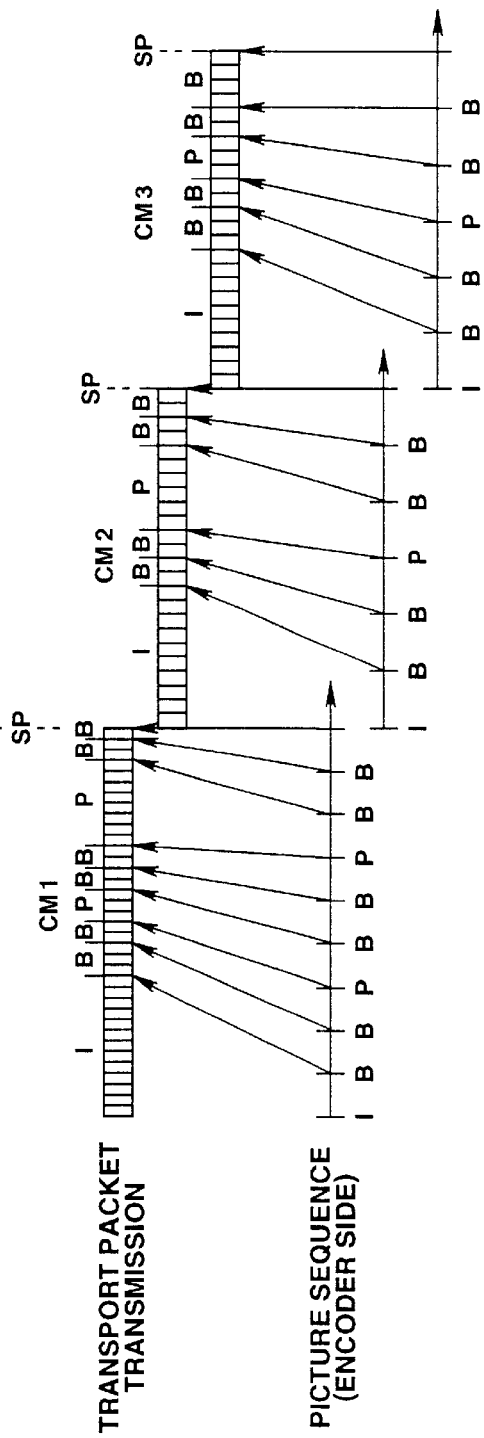
FIG.7A VBV BUFFER (DECODER SIDE)
FIG.7B TRANSPORT PACKET TRANSMISSION / PICTURE SEQUENCE (ENCODER SIDE)

| Syntax | No. of bits | |
|---|---|---|
| TS_program_map_section ( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     program_info_length | 12 | uimsbf |
|     for (i = 0 ; i < N ; i++) { | | |
|         descriptor ( ) | | |
|     } | | |
|     for (i = 0 ; i < N1 ; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|     for (i = 0 ; i < N2 ; i++) { | | |
|         descriptor ( ) | | |
|     } | | |
|     } | | |
|     CRC_32 | 32 | rpchof |
| } | | |

FIG.11

| Syntax | No. of bits | |
|---|---|---|
| program_insertion_descriptor ( ) { | | |
|     descriptor_tag | 8 | uimsbf |
|     descriptor_length | 8 | uimsbf |
|     . . . . . | ... | . . . . |
|     . . . . . | ... | . . . . |
|     . . . . . | ... | . . . . |
|     . . . . . | ... | . . . . |

FIG.12

| Syntax | No. of bits | |
|---|---|---|
| program_insertion_descriptor ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     . . . . . | ... | . . . . |
|     . . . . . | ... | . . . . |
|     for ( i = 0 ; i < N ; i++ ) { | | |
|         descriptor ( ) | | |
|     } | | |
|     . . . . . | ... | . . . . |
|     . . . . . | ... | . . . . |
|     CRC_32 | 32 | rpchof |
| } | | |

FIG.13

METHOD AND APPARATUS FOR INSERTING AN IMAGE MATERIAL

BACKGROUND OF THE INVENTION

1. Field of the Invention

The present invention relates to a method and an apparatus for supplying an image material such as a broadcasting program, and more particularly to the method and the apparatus for inserting an image material such as a commercial film in the main image material such as a broadcasting program.

2. Description of the Related Art

In recent days, the so-called MPEG standard system has been proposed as a technique of compressing and coding a moving picture signal. The MPEG (Moving Picture Image Coding Experts Group) means an organization for studying coding of a moving picture image to be stored. This organization is an abbreviation of a working department of experts for studying standardization of the technique of compressing a moving picture. This organization is established in 1988 under the control of the International Standardization Organization (ISO) and the International Electrotechnical Commission (IEC). The technique of compressing data of a moving picture and speech, standardized by the organization, is referred to as an MPEG system.

The MPEG standards consist of the MPEG1, which is a phase 1 on the standardizing work, and the MPEG2, which is a phase 2 thereon. The difference between them will be briefly described below. The MPEG1 is the standards mainly for storage medium such as a CD-ROM, while the MPEG2 is the standards covering a wide range of medium including an application program of the MPEG1.

The MPEG2 output stream is divided into two types of systems, one of which is referred to as a program stream (MPEG2-PS, PS: Program Stream) and the other of which is referred to as a transport stream (MPEG2-TS TS: Transport Stream). The program stream is intended for the storage medium like the MPEG1. The transport stream is intended for a transmission medium.

This MPEG2 system has a function of transforming plural programs into one stream (data train). Hence, it may correspond to a TV broadcasting program, for example. Further, it allows for free organization of programs and further provides an expansion function and an additional function for various applications. To realize those functions, there are provided directory information for facilitating random access and type information for representing a type of each stream.

The MPEG system has the following flow from coding to decoding.

In the flow of coding in an encoder, a video signal and an audio signal are respectively coded as keeping them associated with each other. Next, each coded stream is multiplexed by a multiplexer in a manner to apply to a format of a transmission medium such as a storage medium or a network of the stream according to the application program. Then, the multiplexed data is transmitted or recorded.

In the flow of decoding in a receiver decoder, on the other hand, the received multiplexed stream is separated into the respective streams such as the video signal stream and the audio signal stream by a demultiplexer and then those separated streams are sent to a decoder. Next, each stream is decoded by a decoder and then is outputted to an output unit (video monitor or a speaker).

As mentioned above, the MPEG system is executed to time-divisionally multiplex plural coded streams into one stream and, on the receiving side, to synchronously decode the multiplexed stream into each stream as intended on the transmission side and reproduce the streams.

The MPEG system has a packet-based multiplexing system as a time-divisional multiplexing system. The packet-based multiplexing is a time-divisional transmitting system for dividing a video signal and an audio signal into streams of a fixed length called a packet, adding additional information such as a header to each packet, and switching the video packet and the audio packet into each other at a proper time in the case of multiplexing the video signal and the audio signal. The packet contains information for identifying an attribute of the signal, which indicates if the signal is a video signal or an audio signal, at the head portion called a header. In some cases, the packet may contain at its tail a CRC (Cyclic Redundancy Code) for detecting a bit error on the transmission.

The packet length strongly depends on the transmission medium and the application. The packet length may be short (53 bytes) as at ATM (Asynchronous Transfer Mode) or long (4096 bytes) like an optical disk system. In the MPEG, the upper length limit of the packet is about $2^{16}$ (64 Kbytes) and the packet length may be fixed or variable for providing the packet with flexibility. Further, the MPEG allows a variable transmission speed so that the intermittent transmission of packets is made possible. The fixedly necessary portions such as the header do not depend on the packet length. Hence, if the packet is short, the overhead (additional data needed for multiplexing) is made so large that the transmission efficiency is dropped. However, the short packet needs only a short switching time for time-divisional multiplexing. Hence, the short packet has a merit that it reduces a delay caused by the multiplexing and a buffer memory in amount.

In the MPEG1 and the MPEG2-PS, the highest layer of the packet of the video signal or the audio signal is called a pack layer. Normally, a pack of bundling plural packets is a constitutional unit when the packets are treated. The pack header contains additional information for referring to a time reference for synchronous reproduction (to be discussed below). The main object of the pack is to provide a capability of decoding and reproducing the stream on its halfway point.

Herein, in the MPEG synchronous system, each decoding and reproducing unit that is referred to as an access unit of the video and the audio signals (the unit of the video signal is one frame and the unit of the audio signal is one audio frame) contains information called a time stamp for indicating when it is to be decoded and reproduced). The time stamp is given a time reference by the information called SCR (System Clock Reference).

The time stamp is a tag for managing a time in the decoding and reproducing process. The tag is added to each access unit. The time stamp is divided into two types of time stamps, one of which is referred to as a PTS (Presentation Time Stamp) and the other one of which is referred to as a DTS (Decoding Time Stamp). The PTS is the information for managing the time of reproduction and output. The DTS is the information for managing the time of decoding. If the head of the access unit is contained in a packet, these time stamps are added to the packet header. If no head of the access unit is contained in the packet, no time stamp is added to the packet header. Further, if two or more heads of the access units are contained in a packet, only the time stamp corresponding to the first access unit is added to the packet header.

As to the PTS, when the STC (System Time Clock) located inside of a reference decoder of the MPEG system coincides with the PTS, the access unit is reproduced and outputted. As to the DTS, the MPEG is arranged so that an I picture and a P picture are placed before a B picture when those pictures are sent out to the coded stream. Hence, the decoding sequence is different from the reproducing and outputting sequence. If the PTS is different from the DTS, both of the time stamps are added. If both coincide with each other, only the PTS is added.

The SCR (System Clock Reference) and the PCR (Program Clock Reference) are the information for setting and calibrating a STC (basic synchronous signal) value, that is, the time standard, into a value intended on the encoder side through the effect of the MPEG system decoder containing a video signal and an audio signal decoders. When using the SCR and the PCR, only the SCR and the PCR are not enough. Further, the timing accuracy (arrival time to the decoder) of the byte in the stream carrying the SCR and the PCR is required. In the MPEG2, the SCR or the PCR is composed of six bytes when they are sent. On the decoder side, on the instance of the arrival of the final byte, the STC is required to set a value indicated by the SCR or the PCR. The integration of the STC with the PLL (Phase-locked Loop) makes it possible to provide the decoder with the STC whose frequency completely coincides with the system clock of the decoder. In the MPEG2-TS (Transport Stream) (to be discussed below), this PLL function has to be given to the decoder As mentioned above, the MPEG2 has a multiprogram-corresponding function that makes it possible to transmit plural programs. This function is a function of time-divisionally multiplexing lots of coded streams at a relatively short transmission unit called a transport packet. Only the MPEG2 has the foregoing multiprogram correspondence.

The stream of the MPEG2 has two kinds of multiplexing and separating systems for corresponding to the multiprogram, one of which is referred to as a PS (Program Stream) and the other one of which is referred to as a TS (Transport Stream). The transport packet contains the information for identifying the content of the packet data at the header portion. Based on the information, the packet required for reproducing the target program is picked out of a DMUX (demultiplexer) and then is decoded.

This transport packet is a relatively short packet with a fixed length of 188 bytes as a result of considering the connectivity with the ATM. The packet length of the ATM has the real data of 47 bytes. (One of 48 bytes of a payload (user information) of the ATM cell is used for synchronizing with the sequence.) One transport packet is allowed to be transmitted on four ATM packets (cells). The great difference between the transport stream (TS) and the program stream (PS) is as follows. The program stream (PS) is arranged to group plural packets (called the PES (Packetized Elementary Stream) in the MPEG2) and compose a pack, while the transport stream (TS) is arranged to re-divide the packet and transmit the packet on plural transport packets. Hence, the PES packet in the transport stream (TS) is served as a pack in the PS (and the MPEG1) and is expanded so that the similar information to the pack header may be transmitted in the PES packet.

The transport stream for corresponding to the multiprogram needs some kinds of information. Those pieces of information indicate which of the program is selected from plural programs, which of the packet is picked up, and how the packet is decoded, for the purpose of transmitting lots of video signal and audio signal streams. These pieces of program specification information are generally referred to as PSI (Program Specific Information). The PSI is transmitted on a packet having a specific identification code or a packet indicated by the primary PSI. The reference decoder for the transport stream (TS) provides a system buffer memory and a system decoder for the PSI processing. The PSI is described in detail in Program Specific Information of 2.4.4 of ISO/IEC13818-1.

Next, the data structure of the MPEG2-TS will be described below.

The data structure of the transport packet is analogous to the system of the ATM standardized in the ITU-T (previous CCITT) because of treating plural programs. FIG. 1 hierarchically illustrates the data structure of the transport packet, the meaning and the object of each information item will be described below. The transport stream syntax shown in FIG. 1 is specified by the ISO13818-1. Hence, the description thereabout is limited herein.

As shown in FIG. 1A, the transport stream is multiplexed and separated by the transport packet of a fixed length of 188 bytes. This transport packet consists of the header portion and the payload portion.

The header portion of the transport packet is structured as shown in FIG. 1B to FIG. 1D.

As shown in FIG. 1B, the transport packet includes a header composed of a synchronous byte portion, an error indicator portion, a unit start indicator portion, a transport packet priority portion, a PID portion, a scramble control portion, an adaptation and field control portion, a cyclic counter portion, and an adaptation and field portion.

A synchronous signal of 8 bits is positioned at the synchronous byte portion. The synchronous signal is used for the decoder to detect a head of the transport packet. One bit is positioned at the error indicator portion. This bit is used for indicating the presence or the absence of a bit error in this packet. Also, one bit is positioned at the unit start indicator portion. This bit is used for indicating that a new PES packet is started from the payload (effective packet data) of the transport packet. The transport packet priority portion is also composed of one bit for indicating the significance of this packet. The PID (Packet Identification) portion is composed of stream identification information of 13 bits for indicating an attribute of each stream of the packet. The scramble control portion is composed of two bits for indicating the absence or the presence and the type of a scramble of the payload of this packet. The adaptation field control portion is composed of two bits for indicating the absence or the presence of the adaptation field and the payload in this packet. The cyclic counter portion is composed of the information for detecting the packet with the same PID is partially discarded on the halfway. The four-bit cyclic counter information is detected on its continuity. The adaptation field portion may be inputted with the additional information about each stream or a stuffing byte (ineffective data byte) as an option. This makes it possible to transmit a dynamic state change of each stream.

As shown in FIG. 1C, the adaptation field portion is composed of an adaptation field length portion, a discontinuity indicator portion, a random access indicator portion, a stream priority indicator portion, five flags, an optional field portion, and a stuffing byte portion.

The adaptation field length portion is inputted with eight bits for indicating the length of the adaptation field portion. The discontinuity indicator portion is inputted with one bit for indicating that the system clock is reset to a new content in the next packet with the same PID. The random access display portion is inputted with one bit for indicating a sequence header of a video signal and a start of a frame of an audio signal. The stream priority indicator portion is inputted with one bit for indicating that the significant portion of each stream is located at the payload of this packet. For example, this corresponds to an intra-coded portion about the video signal. As shown in FIG. 1D, the optional field portion is composed of a PCR (Program Clock Reference) portion of 42 bits, an OPCR (Original PRC) portion of 42 bits, a splice and countdown portion of 8 bits, a transport private data length and data portion, and an adaptation field expansion portion. The splice and countdown portion is inputted with eight bits for indicating the number of transport packets with the same PID existing up to a splice point (SP). This function makes it possible to insert a CM (replace part of the stream) at a splice point on the transmission. The stuffing byte portion may be inputted with a stuffing byte of 8×M bits.

As shown in FIG. 1E, the optional field portion is composed of a lwt_valid_flag (legal time window_valid_flag) portion, a ltw_offset (legal time window_offset) portion, a piecewise rate portion, a splice type portion, and a DTS_next_au portion. The splice type portion is inputted with four bytes for indicating the specification of MP@ML (Main Profile at Main Level) at the MPEG2. The DTS_next_au portion is inputted with 33 bits for indicating a decoding time of the first access unit succeeding the splice point.

The decoding and reproduction of the transport stream are required to select one of plural programs and get to know the PIDs (normally, a plurality of PIDs for the video and the audio) of the transport packet of each stream required for decoding and reproducing the selected program. Next, the parameter information and the associating information of each stream are required. Hence, for doing many stepping operations, it is necessary to obtain several pieces of additional table information (PSI). These pieces of PSI are transmitted on the data structure called a section.

In this section, the special information to be transmitted in the packet with PID=0 is, for example, a program association table (PAT). This indicates the PID of the transport packet which transmits a table (program map table; PMT, a directory table of one program) having the program structure described therein at each program number (16 bits).

The program map table describes an identification number of the program and the PID list and the accessory information of the transport packet with which each stream such as a video signal stream or an audio stream composing the program is transmitted. The reason why the table is divided into the program association table and the program map table is that if all is described in only one table, the table is too large and needs too large memory for storing the table and a long time for accessing the program described at the tail of the table.

The section includes a conditional access table as an option. This table is not necessarily required but is an accessory table for an authorized user to decode and reproduce the scrambled stream for limiting the decoding and the reproduction.

By the way, the system for compressing and coding a moving picture like the foregoing MPEG2 is used for compressing and coding a broadcasting material in a broadcasting station (referred to as a main station) when the main station for supplying an image material such as a broadcasting program (referred to as a broadcasting material and a program material) operates to transmit the broadcasting material to each station composing the broadcasting network (referred to as a network station). As such, the compressed and coded stream transmitted from the main station to the network station is made to be the transport stream (TS).

When the network station receives the transport stream of the broadcasting material from the main station, the network station operates to insert its own material such as a CM image (simply referred to as a CM) to the transport stream of the broadcasting material and then retransmit or broadcast the resulting stream. The material to be inserted into the broadcasting material is an inserting material.

Herein, assuming that the splice of plural inserting materials is inserted to the transport stream of the broadcasting material, the inserting materials are compressed and coded in advance by the compressing and coding method like the MPEG2. If these inserting materials have different bit rates from one another, the following problem takes place.

That is, in the MPEG system, the coded bit stream has to meet the conditions required by a virtual buffer verifier called VBV (video buffering verifier). For example, consider that two inserting materials are spliced. If these inserting materials have the different bit rates from each other, a buffer occupancy control in coding the inserting material is pulled by the bit rate of the next inserting material spliced thereto.

In the MPEG system, at first, the buffer occupancy of the VBV is empty, and the VBV is filled with the data from the bit stream only for the time given by the vbv_delay located at the picture header of the MPEG syntax. The inserting materials have the different vbv_delay from each other. Hence, the random combination of the inserting materials is not made possible.

As a result of splicing the inserting materials, even if the buffer memories of the VBV are located continuously, it is not guaranteed that the presentation times are continuous at the splice point. At the splice point given when the spliced points are not continuous, it is presumed that the picture is frozen in later decoding.

Further, the bit occurrence amount of each picture in coding it cannot be exactly grasped until the picture is coded. For some patterns, hence, the presumption of the buffer control is not matched to the exact amount. It means that it is difficult for the inserting materials to reach the target buffer occupancy amount.

As mentioned above, in the case that the inserting materials are independently coded and the buffer limit to the picture of the end of the inserting material is not complete, if the inserting materials are randomly switched and combined on the MPEG stream, the overflow/underflow of the VBV buffer is brought about. Thus, the resulting material containing the spliced inserting materials does not meet the regulations of ISO13818-2 and Annex C of ISO11172-2. That is, the reproduction of the material is made impossible.

Hence, the inserting unit of each CM cannot be managed. Further, each material such as the CM inside of the inserting section of the material is coded at each combination of the materials and is managed by the material server for saving the inserting materials.

The status that the overflow or the underflow of the VBV buffer takes place will be described with reference to FIGS. 2 to 5.

FIG. 2 shows the case that the limit of the target buffer occupancy is not met when using the receiver decoder for accessing vbv_delay of the picture header at each time. That is, FIG. 2 shows the relation between the transport stream (TS) reaching at a constant rate and the VBV buffer and the relation between the input video data (picture sequence)

reaching at regular sections. The inclination of lines for indicating the buffer occupancy shown in FIG. 2A represents a bit rate. The vertically lowered portion of the lines represents the bit amount pulled by the video decoder for reproducing each picture. The pulling timing means the presentation time. As will be understood from FIG. 2, the input video data is compressed to the bit amount according to the information amount of each picture and then is made to be the transport stream (TS) having a different number of packets. Further, FIG. 2(A) shows the change of the buffer occupancy of the VBV buffer on the receiver decoder side when three CMs (CM1, CM2, CM3) are spliced as the inserting materials. FIG. 2B shows the input sequence of the pictures on the encoder side for encoding the CM1, the CM2 and the CM3 and the transmitting sequence of the transport packets. In FIG. 2, I denotes an I picture (Intra-coded picture), P denotes a P picture (Predictive-coded picture), and B denotes a B picture (Bidirectionally predictive-coded picture). Further, SP denotes a splice point. tc denotes a target buffer occupancy originally required when the transport streams are connected at a splice point. ig denotes an input gap. io denotes an input overlap.

As is understood from FIG. 2, the receiver decoder for accessing vbv_delay of the picture header at each time has to wait for pulling of data from the buffer by vbv_delay shown in FIG. 2A. Hence, no breakup of the VBV buffer takes place.

However, at the period $pe_A$ shown in FIG. 2A, the picture is frozen on the receiver decoder, so that the disorder of the display synchronicity takes place. At the period $pe_B$ shown in FIG. 2A, the display section is made so short that the picture is broken by exceeding the decoder processing speed or the display synchronicity is disordered.

FIG. 3 shows the case that the limit of the target buffer occupancy is not met in the case of using the receiver decoder that does not access vbv_delay of the picture header at each time. That is, FIG. 3 shows the relation between the transport stream (TS) reaching at a constant rate and the VBV buffer and the relation between the input video data (picture sequence) reaching at regular sections and the transport stream (TS). Like the case of FIG. 2, in FIG. 3, the input video data is compressed into a bit amount according to the information amount of each picture and is made to be a transport stream (TS) having a different number of packets. The inclination of the lines for representing the buffer occupancy shown in FIG. 3 represents a bit rate. The vertically lowered portion of the lines represents the amount of bits pulled by the video decoder for reproducing each picture. The receiver decoder shown in FIG. 3 operates to access vbv_delay of the picture header when there exists a sequence_start_code specified by the MPEG. In FIGS. 3A and 3C, when two CMs (CM1 and CM2) are spliced as the inserting materials, the change of the buffer occupancy of the VBV buffer is shown on the receiver decoder side. FIGS. 3B and 3D show the input sequence of the pictures and the transmission sequence of the transport packets on the encoder side for coding each picture of the CM1 or the CM2. FIGS. 3A and 3B show the case that the underflow of the VBV buffer takes place. FIGS. 3C and 3D show the case that the overflow of the VBV buffer takes place. In these figures, I denotes an I picture. P denotes a P picture. B denotes a B picture. SP denotes a splice point. tc denotes a target buffer occupancy originally required when the transport streams are linked at the splice point. ig denotes an input gap. io denotes an input overlap.

As is understood from FIG. 3, the receiver decoder that does not access vbv_delay of the picture header at each time operates to pull the data from the VBV buffer at vbv_delay only when at the initializing state (only when a sequence start code exists). In FIG. 3A, at a point $po_A$, the underflow takes place, so that the VBV buffer is broken up. In FIG. 3C, at a point $po_B$, the overflow takes place, so that the VBV buffer is broken up.

FIG. 4 shows the case that the materials having the different bit rates from each other are spliced in the case of using the receiver decoder for accessing vbv_delay of the picture header at each time. That is, FIG. 4 shows the relation between the transport stream (TS) reaching at the corresponding rate to each material and the VBV buffer and the relation between the input video data (picture sequence) reaching at the corresponding sections to each material and the transport steam (TS). FIGS. 4A and 4C show the change of the buffer occupancy of the VBV buffer on the receiver decoder side when the inserting materials having the different bit rates from each other are spliced with each other. FIGS. 4B and 4D shows the input sequence of the pictures and the transmission sequence of the transport packets on the encoder side for coding each picture of these inserting materials. FIGS. 4A and 4B concern with the case that the bit rate of the spliced materials goes down. FIGS. 4C and 4D concern with the case that the bit rate of the spliced materials goes up. Like the case of FIG. 2, in FIG. 4, the inclination of the lines for representing the buffer occupancy represents a bit rate. The vertically lowered portion of the lines represents the amount of bits pulled by the video decoder for reproducing each picture. In FIG. 4, I denotes an I picture. P denotes a P picture. B denotes a B picture. Sp denotes a splice point. st denotes a point at which the packet is stuffed.

In FIGS. 4A and 4B, the breakup of the VBV buffer does not take place. However, the presentation time is made discontinuous. In FIGS. 4C and 4D, the overflow of the VBV buffer takes place.

FIG. 5 shows the case that the materials having the different bit rates from each other are spliced with each other in the case of using the receiver decoder that does not access vbv_delay of the picture header at each time. That is, FIG. 5 shows the relation between the transport stream (TS) reaching at the corresponding rate to each material and the VBV buffer and the relation between the input video data (picture sequence) reaching at the corresponding sections to each material and the transport stream (TS). The receiver decoder shown in FIG. 5 operates to access vbv_delay of the picture header when there exists a sequence start code regulated by the MPEG. FIGS. 5A and 5C show the change of the buffer occupancy of the VBV buffer on the receiver decoder when the inserting materials having the different bit rates from each other are spliced with each other. FIGS. 5B and 5D show the input sequence of the pictures and the transmission sequence of the transport packets on the encoder for coding each picture of the inserting materials. FIGS. 5A and 5B concern with the case that the bit rate of the spliced materials goes down. FIGS. 5C and 5D concern with the case that the bit rate of the spliced materials goes up. Like the case of FIG. 2, in FIG. 5, the inclination of the lines for representing the buffer occupancy represents the bit rate. The vertically lowered portion of the lines represents the amount of bits pulled by the video decoder for reproducing each picture. In FIG. 5, I denotes an I picture. P denotes a P picture. B denotes a B picture. SP denotes a splice point. st denotes a point at which the packet is stuffed.

As is understood from FIG. 5, the receiver decoder that does not access vbv_delay of the picture header at each time operates to pull out data from the VBV buffer at vbv_delay only at the initializing state (only when there exists a sequence start code). In the case shown in FIGS. 5A and 5B, the underflow takes place, so that the VBV buffer is broken up. In the case shown in FIGS. 5C and 5D, the overflow takes place, so that the VBV buffer is broken up.

SUMMARY OF THE INVENTION

The present invention is made by considering the foregoing problems. It is an object of the present invention to provide a method and an apparatus for supplying an image material which method and apparatus are arranged to prevent the VBV buffer from being broken, keep the spliced point continuous, prevent the picture from being frozen in decoding even if the different inserting materials are spliced with each other and to randomly combine plural inserting materials with each other.

According to an asepct of the invention, a method for supplying an image material, taking the steps of compressing and coding the image material, generating a coded bit stream meeting a condition requested by a virtual buffer verifier, and adding information of a splice point when splicing the coded bit stream, includes the steps of: compressing and coding the image material; compressing and coding the same image material as the image material compressed and coded at the first step; controlling a bit rate of a coded bit stream composed by compressing and coding the image material, for the second compressing and coding step, based on the information about an occurrence amount of bits derived as a result of compressing and coding at the first compressing and coding step and controlling generation of the coded bit stream so that the virtual buffer verifier is made to have a target buffer occupancy at the splice point.

According to another aspect of the invention, an apparatus for supplying an image material, for supplying a bit stream of a specific transmission format composed by compressing and coding the image material, includes: means for describing an insertion point for indicating a location where the image material is to be inserted and information about an inserting material for indicating an image material to be inserted in a section indicated by the insertion point on the bit stream of the specific transmission format.

According to another aspect of the invention, a method for supplying an image material, for supplying a bit stream of a specific transmission format composed by compressing and coding the image material, includes the step of: describing an insertion point for indicating a location where the image material is to be inserted and information about an inserting material for indicating an image material to be inserted into a section indicated by the insertion point on the bit stream of the specific transmission format.

According to another aspect of the invention, a method for inserting an image material, for inserting another image material to a bit stream of a specific transmission format transmitted in the state of compressing and coding an image material, includes the steps: detecting an insertion point and information about an insertion material from the bit stream of the specific transmission format composed by describing at least the insertion point for indicating a location where the image material is to be inserted and the information about the inserting material for indicating an image material to be inserted into a section indicated by the insertion point; storing an inserting material composed of other image materials; and taking out an inserting material corresponding to the information about the inserting material from the stored inserting materials and inserting the inserting material into the section indicated by the insertion point of the bit stream of the specific transmission format.

Further objects and advantages of the present invention will be apparent from the following description of the preferred embodiments of the invention as illustrated in the accompanying drawings.

BRIEF DESCRIPTION OF THE DRAWINGS

FIGS. 1A to 1E are views showing the data structures of MPEG2-system transport streams;

FIGS. 2A and 2B are views showing a VBV buffer occupancy, an input sequence of pictures, and a transmission sequence of transport packets provided when a constraint of a target buffer occupancy is not met in the case of using a receiver decoder that operates to access vbv_delay of a picture header at each time;

FIGS. 3A to 3D are views showing a VBV buffer occupancy, an input sequence of pictures, and a transmission sequence of transport packets provided when a constraint of a target buffer occupancy is not met in the case of using a receiver decoder that does not operate to access vbv_delay of a picture header at each time;

FIGS. 4A to 4D are views showing a VBV buffer occupancy, an input sequence of pictures, and a transmission sequence of transport packets provided when a material with a bit rate is spliced with another material with another bit rate in the case of using a receiver decoder that operates to access vbv_delay of a picture header at each time;

FIGS. 5A to 5D are views showing a VBV buffer occupancy, an input sequence of pictures, and a transmission sequence of transport packets provided when a material with a bit rate is spliced with another material with another bit rate in the case of using a receiver decoder that does not operate to access vbv_delay of a picture header at each time;

FIGS. 7A and 7B are views showing a VBV buffer occupancy on a decoder side when an inserting material is spliced with a broadcasting material, an input sequence of pictures and a transmission sequence of transport packets on an encoder for coding each picture of each inserting material;

FIG. 11 is a view showing a syntax of a transport stream program map section and a descriptor;

FIG. 12 is a view showing a syntax of an example of a descriptor for inserting a material; and FIG. 13 is a view showing a syntax of another example of a descriptor for inserting a material.

DESCRIPTION OF THE PREFERRED EMBODIMENTS

The apparatus for supplying an image material according to an embodiment of the present invention is arranged to compress and code a program source of an image material such as a CM in a system for compressing and coding a moving picture such as MPEG2, generate the transport stream of the MPEG2 from the compressed and coded bit stream, store the transport stream, and output the stored transport stream such as the CM as well as randomly combine the transport streams of plural inserting materials so that the combination may be spliced with the broadcasting material. Herein, the image material such as the CM is a material to be inserted to the transport stream of the broadcasting material transmitted from the broadcasting station for providing the broadcasting material such as a program. In the following description, the image material such as the CM is called the inserting material. The apparatus for supplying the image material according to the present invention is located in a network station in which the transport stream of the inserting material is inserted to the transport stream of the broadcasting material transmitted from the broadcasting station. The content of the invention is intended for realizing the regulations of ISO13818-2, Annex C of ISO11172-2 and Annex L of ISO13818-1.

The apparatus for supplying an image material according to the invention makes it possible to randomly combine the transport streams of the inserting materials and splice the combination to the broadcasting material. For this purpose, hence, the compressed and coded bit streams of the inserting materials have the same bit rate as each other. Further, the VBV buffer occupancies at the splice points where the transport streams are spliced are unified in a manner to suit to vbv_delay.

The concrete arrangement for realizing the aforementioned function will be described with reference to FIG. 6.

Figure 6:
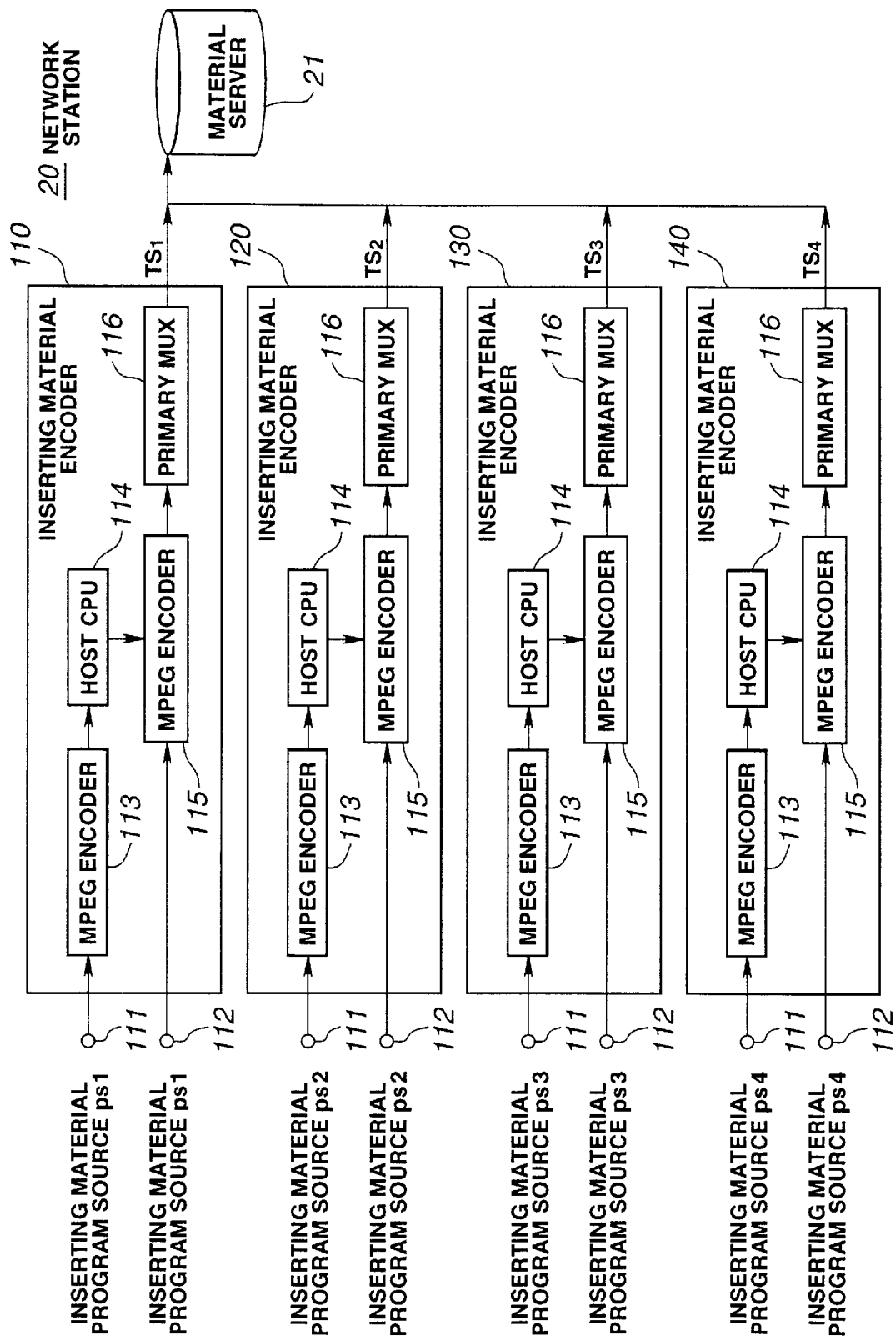
FIG. 6 is a circuit diagram showing a system of an apparatus for supplying an image material according to an embodiment of the invention.

The network station 20 shown in FIG. 6 includes encoders 110, 120, 130, 140, . . . and a material server 21. Those encoders are served to compress and code the corresponding program sources ps1, ps2, ps3, ps4, . . . for generating the transport streams $TS_1$, $TS_2$, $TS_3$, $TS_4$, . . . The material server 21 serves to store the transport streams $TS_1$, $TS_2$, $TS_3$, $TS_4$, . . . transmitted from the encoders 110, 120, 130, 140, . . . .

Those encoders 110, 120, 130, 140, . . . operate to code the corresponding program sources ps1, ps2, ps3, ps4, . . . so that the coded program sources have the same bit rate. Further, those encoders also operate to match the VBV buffer occupancy at a splice point where the transport streams are linked to the target buffer occupancy suited to the vbv_delay of the next transport stream spliced at the point.

That is, when the transport streams $TS_1$, $TS_2$, $TS_3$, $TS_4$, . . . are randomly combined in splicing them, as shown in FIG. 7, those encoders 110, 120, 130, 140, . . . operate to control the combination so that the transport streams of the inserting materials have the same bit rate as well as control the VBV buffer occupancy at the splice point so that the spliced pictures are made continuous.

FIG. 7A shows the change of the VBV buffer occupancy on the receiver decoder side when the three CMs (CM1, CM2, CM3) are spliced as the inserting materials. FIG. 7B shows the input sequence of the pictures and the transmission sequence of the transport packets on the encoder side for encoding each picture of the CM1, the CM2 and the CM3. Like the above, in FIG. 7, the inclination of the lines for indicating the buffer occupancy represents the bit rate, and the vertically lowered portion of the lines represent an amount of bits pulled by the video decoder for reproducing each picture. In FIG. 7, I denotes an I picture. P denotes a P picture. B denotes a B picture. SP denotes a splice point. tc denotes a target buffer occupancy originally required when the transport streams are spliced at the splice point.

As is understood from FIG. 7, when the different three inserting materials CM1, CM2 and CM3 are spliced, these inserting materials are made to have the same bit rate. At a time, the VBV buffer occupancy at the splice point where one transport stream of the CM is spliced with another is made to match to the target buffer occupancy suited to vbv_delay of the next transport stream spliced at the point. As such, if the inserting materials of three CM1, CM2 and CM3 are spliced, no breakup takes place in the VBV buffer, so that the splice point may be kept continuous. This serves to prevent the picture from being frozen in decoding and makes it possible to randomly combine plural inserting materials.

The arrangement shown in FIG. 6 for realizing the foregoing function will be more concretely described below. The encoders 110, 120, 130, 140 have the same arrangement, so that the encoder 110 will be described as a representative example.

In FIG. 6, the program source ps1 of the inserting material such as the CM is supplied to the terminals 111 and 112 of the encoder 110. In actual, however, the program source ps1 supplied to the terminal 112 is required to be later than the program source ps1 supplied to the terminal 111 by a longer time than the time required for an MPEG encoder 113 and a host CPU 114 (to be discussed below) to process the signal.

The encoder 110 includes a first MPEG encoder 113, a second MPEG encoder 115, a host CPU 114, and a primary multiplexer 116. The first MPEG encoder 113 operates to compress and code the program source ps1 supplied through the terminal 111 in the MPEG2 manner. The second MPEG encoder 115 operates to compress and code the program source ps1 supplied through the terminal 112 in the MPEG2 manner. The host CPU 114 operates to receive the information about the occurrence amount of bits MPEG-coded in the first MPEG encoder 113 and control the coding of the second MPEG encoder 115 based on the information. The primary multiplexer 116 operates to multiplex the coded bit streams sent from the second MPEG encoder 115 for generating and outputting the multiplexed transport stream $TS_1$.

The first MPEG encoder 113 performs the MEPG2 compressing and coding process with a fixed quantizing step size for coding the program stream ps1 and transmits the information about the occurrence of bits to the host CPU 114.

On the other hand, the second MPEG encoder 115 operates to control the host CPU 114 based on the information about the occurrence amount of bits MPEG-coded by the first MPEG encoder 113 so that the inserting materials have the same bit rate in compressing and coding the program stream ps1. At a time, the second MPEG encoder 115 operates to suit the VBV buffer occupancy at the splice point to the vbv_delay of the next transport stream spliced thereto so that the transport streams spliced with each other provide the watcher with the continuous pictures.

As set forth above, the compressed and coded bit stream (elementary stream: ES) of the program source ps1 generated by the second MPEG encoder 115 is transformed into the transport stream ($TS_1$) through the effect of the primary multiplexer 116. Then, the transport stream ($TS_1$) is saved in the material server 21.

The material server 21 also saves the other transport streams $TS_2$, $TS_3$, $TS_4$, . . . sent from the corresponding inserting material encoders 120, 130, 140, . . . , which have the same arrangement as the foregoing inserting material encoder 110.

The transport streams are picked out of the material server 21 and combined at request of the user. Then, the combination is transmitted. The combination of the transport streams is inserted into the transport stream of the broadcasting material sent from the broadcasting station as will be discussed below.

In the arrangement shown in FIG. 6, the encoders operate to MPEG-code the corresponding program sources on two paths. On the occurrence amount of bits generated by the MEPG coding means (first MPEG encoder 113) of the first path, the MPEG coding means on the second path (second MPEG encoder 115) is controlled. The use of the two paths for coding the inserting material such as the CM is made possible on the following ground. That is, the network station prepares the inserting material such as the CM for the transport stream of the broadcasting material transmitted in real time from the broadcasting station. Then, the network station operates to insert the transport stream of the inserting material to the transport stream of the broadcasting material transmitted from the broadcasting station and then re-transmit (or broadcast) the resulting transport stream. Hence, the preparation of the inserting material is not required to be done in real time. It means that the operation makes allowance for doing the two-path operation in light of time. Further, since the inserting material such as the CM needs to keep its quality high, it is preferable to process the inserting material on the two paths.

Figure 8:
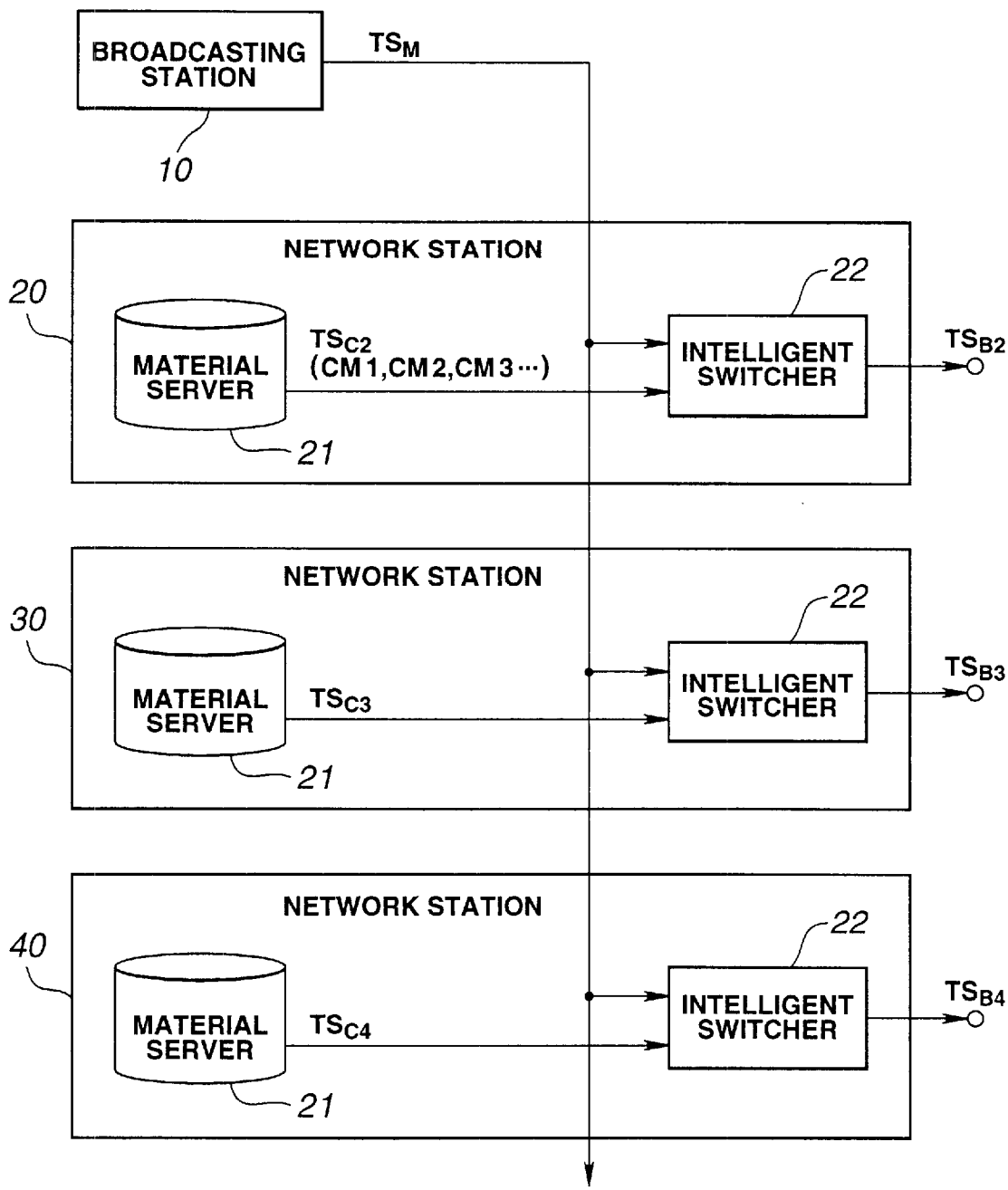
FIG. 8 is a diagram showing an arrangement of a broadcasting station and network stations connected thereto.

Next, the description will be oriented to the arrangement of inserting the transport stream sent from the network station into the transport stream of the broadcasting material sent from the broadcasting station with reference to FIG. 8.

In FIG. 8, the broadcasting station 10 operates to compress and code the program source of the broadcasting material such as a program in the MPEG2 manner and supply the resulting data as the transport stream ($TS_M$) to the network stations 20, 30, 40, . . . .

Each of the network stations 20, 30, 40, . . . where the transport station $TS_M$ is supplied from the broadcasting station 10 has the arrangement shown in FIG. 6. As mentioned above, the transport stream of the inserting material compressed and coded in the MPEG2 manner is pre-stored in the material server 21. Each network station 20, 30, 40, . . . has the same arrangement. Hence, the network station 20 will be described as a representative example.

In the network station 20, the material server 21 operates to store the corresponding transport streams $TS_{C2}$ to plural inserting materials such as the CMs. The material server 21 outputs the transport stream $TS_{C2}$ of the inserting material at the request issued from an intelligent switcher 22.

The intelligent switcher 22 operates to receive the transport stream $TS_M$ of the broadcasting material supplied from the broadcasting station 10 and detect the inserting section and its length based on the splice points contained in the transport stream $TS_M$. The intelligent switcher 22 holds the I/O table (CM I/O table, for example) of the pre-set inserting materials and issues a request for outputting the corresponding inserting material to the material server 21 by collating the I/O table of the inserting materials to the inserting section and its length detected by the intelligent switcher 22. In response to the request, the transport stream $TS_{C2}$ of the inserting material is pulled out of the material server 21 at the request of the intelligent switcher 22. The intelligent switcher 22 operates to splice the transport streams of the inserting materials such as CM1, CM2, CM3, . . . taken out of the server 21 according to the I/O table and insert them into the inserting sections of the transport stream $TS_M$.

The output of the intelligent switcher 22 is re-transmitted (or broadcast) to the outside as the transport stream $TS_{B2}$ composed of the transport streams of the inserting materials inserted into the transport stream of the broadcasting material. The transport stream $TS_{B2}$ re-transmitted from the network station 20 is then transmitted to each home, in which it is received and decoded on the receiver decoder and then is sent to a video monitor and a speaker.

As described above, in the arrangement of this invention, the inserting materials such as the CM to be properly combined are made to have the same bit rate. Hence, the buffer occupancy controlled when coding the inserting material is directly reflected on the buffer occupancy after the inserting materials are spliced so that both of the materials have the same vbv_delay. Since the VBV buffer occupancy of the splice point may be unified according to the vbv_ delay, the spliced transport streams are allowed to be continuously spliced at an section of one picture. This serves to prevent the occurrence of the overflow/underflow of the VBV buffer and makes it possible to randomly combine these inserting materials with each other. The arrangement of this invention makes it possible to randomly combine the inserting materials by randomly switching those materials on the MPEG stream, thereby eliminating the necessity of taking the burdensome steps of coding each combination of the inserting materials and managing the coded combination through the material server.

Moreover, in the arrangement of the invention, the transport stream of the inserting material is prepared through the two paths as mentioned above. Hence, the arrangement makes it possible to easily meet the condition of the VBV buffer occupancy required for keeping the spliced transport streams continuous. This arrangement just needs to code each inserting material of the CM and thus enables to flexibly/ share the inserting materials in any combination.

By the way, the location where the inserting material can be inserted to the transport stream of the broadcasting material is set as the splice point (SP) on the transport stream. Hence, by finding the splice point on the transport stream, it is possible to know the location where the inserting material is to be inserted to the broadcasting material.

As mentioned above, though the insertive location of the inserting material can be grasped from the splice point, no addressing mechanism of the splice point is specified in the MPEG2. That is, in the MPEG2, no method is provided for organically relating the insertive point of the inserting material to the inserting material. Further, it is impossible to grasp the length of the inserting section in advance and determine the way of use of the inserting section. The conventionally feasible method is only a method for counting the number of splice points. Hence, if a transmission error like a burst takes place around the splice point, the count of the splice point is shifted thereafter, so that the conformity is broken up after the transmission error.

Further, assuming that an insertive point for a closed caption except the CMs is prepared on the transport stream, if a certain network station inserts only the CM without re-inserting the closed caption, the point for the closed caption inhibits to insert the CM into a proper point.

In the case that a certain network station uses the transport stream of a CM from the broadcasting station within a certain CM section and another network station desires to use the transport stream of another CM from the broadcasting station, only the conventional control of counting the splice points makes it impossible to implement the foregoing function.

In the case of counting the splice points, by finding the next splice point from a certain splice point, it is possible to grasp the section between the splice points. However, for example, if several CMs with the same length are provided, the control cannot be dynamically executed so that two CMs are inserted within the first CM section and one CM is inserted within the second CM section.

In addition, though the prepared transport streams of plural inserting materials such as CMs have their own PID (Packet Identification), if those transport streams are inserted onto the transport stream of the broadcasting material, they are not treated as the same program. Hence, another PMT (Program Map Table) is required. The switching operation is not regulated by the receiver decoder, so that it is not guaranteed.

By the way, the PCR (Program Clock Reference) uses the discontinuous point on the time base.

In a case that the switching at a packet unit is done on the transport stream without pre-defining an in point and an out point, in general, the coded bit streams are spliced discontinuously, so that no conformity takes place in the VLD (Variable Length Decoding) of the receiver decoder. As a result, the decoding operation is stopped until the next sequence_header is found.

The closed GOP (Group of Picture) is at the splice point. Hence, if the switching is allowed at a spliced point of the GOP with the in point and out point being pre-defined, the image quality at the spliced point is degraded unless the splice point is the closed GOP When the program is Splic on the transport stream, the splice point is detected at th splice_count_down =0.

As a tool for splicing the materials, the followings are prepared.

Discontinuity_indicator,

Splicing_point_flag,

Splice_countdown,

Seamless_splice_flag,

Splice_type, and

DTS_next_au

The meanings of these tools are the same as above, the details of which are described n ISO13818-1.

The apparatus for supplyin an image material according to the present invention is arranged to compress and code a program source such as a broadcasting program in the moving picture compressing and coding system such as the foregoing MPEG2, describe the information about the inserting material such as an attribute, a number a d an inserting section length of the inserting material to he coded bit stream of the broadcasting material, and then transmit the resulting coded bit stream.

Figure 9:
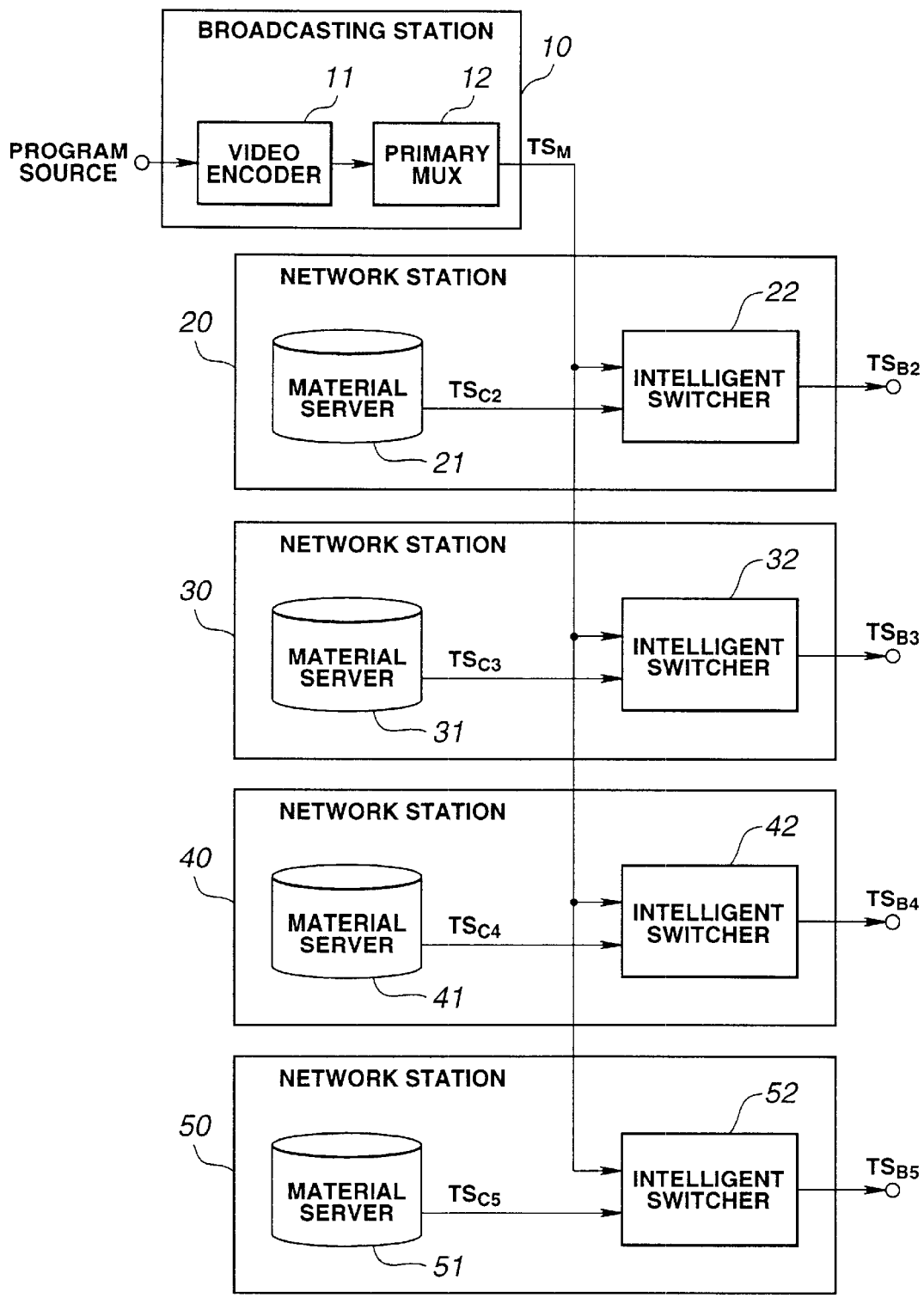
FIG. 9 is a circuit diagram showing a system of an apparatus for supplying an image material and an apparatus for inserting an image material according to an embodiment of the invention.

As shown in FIG. 9, which shows the arrangement of FIG. 8 in detail, as an arrangement example of the apparatus for supplying an image material, he broadcasting station 10 includes a video encoder 11 and primary multiplexer 12. The video encoder 11 operates to compress and code the program source of the broadcasting material in the MPEG2 manner. The primary multiplexer 12 operates to suit each coded bit stream (elementary stream: ES) from the video encoder 11 to the format of a transmission medium such as a network and multiplex the coded bit streams.

To describe this function more concretely, the video encoder 11 operates to determine the coded bit stream (ES) and the splice point based on the information about an in point and an out point for inserting the material, which information is given by the user in advance. This splice point is a spliced point of the GOP and the head of the transport stream corresponding to the in point and the out point is placed at the head of the closed GOP. That is, the head of the PES (Packetized Elementary Stream) is located at the head of the transport stream. Hence, the head of the GOP is put at the head of the payload.

The primary multiplexer 12 operates to secure the adaptation_field where the PCR (Program Clock Reference) is put at the splice point of the in point and the out point, generate the information about the inserting material such as an attribute, a number and an inserting section length of the inserting material as the splicing information for inserting the material, describe the information about the inserting material in a descriptor provided in the PSI (Program Specific Information) of the transport stream of the broadcasting material, and add the information to the transport stream in the section form, for the purpose of multiplexing. The transport stream $TS_M$ where the information about the inserting material obtained by multiplexing of the primary multiplexer 12 is described is transmitted and outputted from the broadcasting station 10.

On the other hand, the apparatus for inserting an image material according to an embodiment of the invention is arranged to prepare the transport stream composed by compressing and coding the inserting material such as the CM, when it receives the transport stream of the broadcasting material compressed and coded in the moving picture compressing and coding system such as the MPEG2, detect and decode the information about the inserting material such as an attribute, a number and an inserting section length of the inserting material described in the transport stream of the broadcasting material, take such a transport stream of the inserting material as suiting to the decoded information about the inserting material, insert the taken transport stream of the inserting material into the transport stream of the broadcasting material based on the information about the inserting material, and output the resulting transport stream.

That is, as shown in FIG. 9, the apparatus for inserting an image material according to an embodiment of the invention corresponds to each network station 20, 30, 40 or 50, which operates to receive the transport stream $TS_M$ of the broadcasting material supplied from the broadcasting station 10, insert the inserting material such as the CM to the transport stream of the broadcasting material, and re-transmit (or re-broadcast) the resulting the transport stream. Each network station includes a material server (or CM server) and an intelligent switcher. The material server operates to save plural transport streams composed by compressing and coding plural inserting materials such as CMs in the MPEG2 manner. The intelligent switcher operates to insert the transport stream $TS_C$ of the inserting material taken from the material server to the transport stream of the broadcasting material supplied from the broadcasting station 10.

Those network stations 20, 30, 40 and 50 have the same arrangement. Hence, the description will be oriented to only the network station 20 as a representative example.

In the network station 20, the material server 21 operates to pre-save the transport streams $TS_C$ composed by compressing and coding plural inserting materials such as CMs in the MPEG2 manner. The material server 21 operates to output the transport stream $TS_{C2}$ of the inserting material in request to the intelligent switcher 22.

The intelligent switcher 22 operates to receive the transport stream $TS_M$ of the broadcasting material supplied from the broadcasting station 10, detect the PSI inside of the transport stream $TS_M$, and decode the information about the inserting material such as an attribute, a number and an inserting section length of the inserting material. Further, the intelligent switcher 22 operates to hold the I/O table (for example, the CM I/O table) of the inserting material pre-set by the network station 20 and issue the request for outputting the inserting material to the material server 21 by collating the I/O table of the inserting material to the decoded result of the PSI. In response to the request, the transport stream $TS_{C2}$ of the inserting material is taken out of the material server 21. The intelligent switcher 22 further operates to insert the transport stream $TS_{C2}$ of the inserting material obtained by the material server 21 into the transport stream $TS_M$ of the broadcasting material through the splice_countdown =0 after detecting the PSI containing the descriptor dedicated to the material to be inserted into the transport stream $TS_M$ of the broadcasting material. When the insertion is done, the PID (Packet Identification, a packet type) of the transport stream of the inserting material is replaced with the PID of the transport stream of the broadcasting material and then the transport stream $TS_{C2}$ is inserted into the transport stream $TS_M$ of the broadcasting material. The intelligent switcher 22 operates to set the discontinuity_indicator so that the PCR (Program Clock Reference) is forcibly updated for matching to the PTS (Presentation Time Stamp).

The output of the intelligent switcher 22 is re-transmitted (or broadcast) to the outside as the transport stream $TS_{B2}$ composed by inserting the transport stream of the broadcasting material into the transport stream of the inserting material. The transport stream $TS_{B2}$ re-transmitted from the network station 20 is distributed to homes, for example, at which the transport stream is received and decoded on the receiving decoder and then is sent to a video monitor and a speaker.

As mentioned above, the apparatus for supplying an image material according to the embodiment of the invention (the broadcasting station 10) is arranged to provide a descriptor for inserting the material to the PSI of the transport stream $TS_M$ of the broadcasting material for organically splicing the splice point (PS) of the transport stream $TS_M$ of the broadcasting material with the transport stream of the inserting material and describe the information about the inserting material such as an attribute, a number and an inserting section interval of the inserting material in the descriptor.

The apparatus for inserting an image material according to the embodiment of the invention (the network station) is arranged to detect the PSI of the transport stream $TS_M$ from the broadcasting station 10 and decode it, take the inserting material such as the CM with the PID requested according to the inserting number, replace the PID of the inserting material with that of the broadcasting material, and insert the transport stream of the inserting material into the transport stream of the broadcasting material.

Further, the content of the invention is applied to the system of ISO13818-1.

FIG. 10 shows three examples of material insertion on the transport stream in the composition shown in FIG. 9.

Figure 10A:
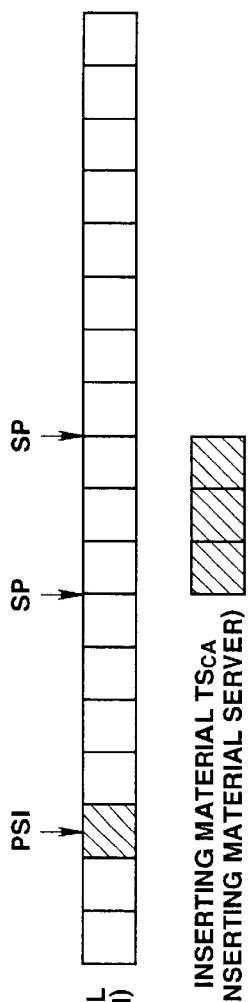
FIGS. 10A to 10C are views for describing how a transport stream of an inserting material is inserted into a transport stream of a b roadcasting material.
Figure 10B:
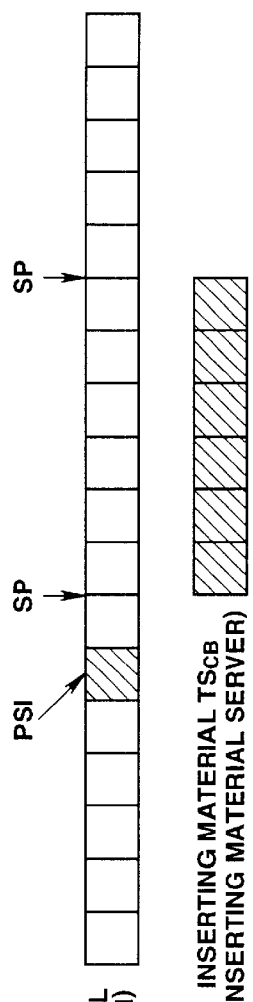
Figure 10C:
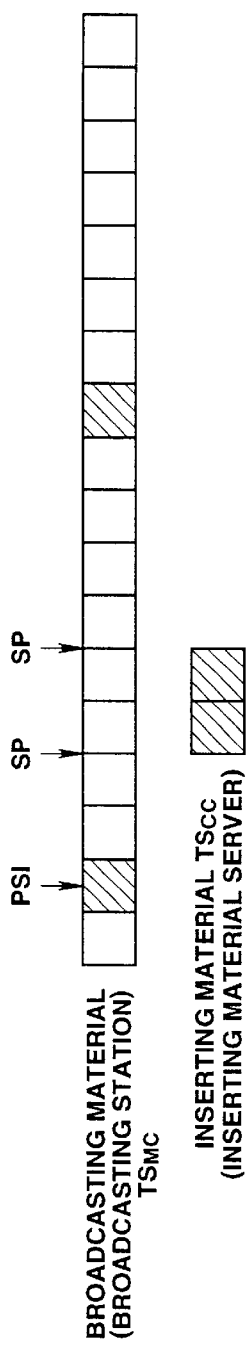

That is, as shown in FIGS. 10A, 10B and 10C, the transport streams $TS_{MA}$, $TS_{MB}$ and $TS_{MC}$ of the broadcasting materials transmitted from the broadcasting station 10 have the PSI located thereon. The PSI contains the information about the inserting material described in the descriptor. When the network station receives the transport streams $TS_{MA}$, $TS_{MB}$ and $TS_{MC}$ of the broadcasting materials, the network station operates to detect the PSI of each of the transport streams and decode the information about the inserting material. Hence, when the transport streams $TS_{CA}$, $TS_{CB}$ and $TS_{CC}$ of the inserting materials sent from the material server are inserted into the corresponding transport streams $TS_{MA}$, $TS_{MB}$ and $TS_{MC}$, the location of the splice point and the length between the splice points can be grasped on the basis of the information about the inserting material. Hence, it is possible to excellently insert the transport streams $TS_{CA}$, $TS_{CB}$ and $TS_{CC}$ of the inserting materials between the splice points.

As described above, the arrangement of this invention utilizes the PSI for inserting the material. As the method for using the PSI, the following two methods will be considered.

As one of the methods for using the PSI, the method will be referred for managing the PSI as the descriptor located inside of the program map table (PMT) of the program map PID specified by the program association table (PAT) of the PSI. FIG. 11 shows a syntax with the program map section (TS_Program_Map_section) of the transport stream and the descriptor as a function, which conforms to the C language. That is, in FIG. 11, the main factors of the TS_Program_Map_section function are a table ID (Table_id), a section syntax indicator (section_syntax_indicator), a section length (section_length), a program number (program_number), a version number (version_number), a current next indicator (current_next_indicator), a section number (section_number), a last section number (last_section_number), a program information length (program_info_length), and so forth. The descriptor is described in the Program and Program Element Descriptor of 2.6 of the ISO/IEC13818-1.

As one of the methods for using the PSI, the method may be considered wherein the descriptor is composed by using a user private (User Privatw 64-255) in the descriptor tag (descriptor tag) shown in Table 2–40 of 2.6.1 of the ISO/IES 13818-1. For example, As a descriptor for inserting the material (Program Insertion Descriptor), it is possible to use the syntax shown in FIG. 12 according to the C language. That is, in FIG. 12, as the Program_insertion_descriptor function, the descriptor tag (descriptor-tag), the descriptor length (descriptor_length) and the like are described.

Further, it is possible to consider the method for independently managing the descriptor by composing the dedicated sector by using the User private 0×40-0×FE of the Table_id assignments values of 2.4.4.4 of the ISO/IEC 13818-1. For example, as the descriptor for inserting the material, it is possible to use the syntax as shown in FIG. 13 according to the C language. In FIG. 13, the table ID (table_id), the section syntax indicator (section_syntax_indicator), the section length (section_length) and the like are described as the Program_insertion_descriptor function.

As described above, according to the embodiment of the invention, the broadcasting station transmits the transport stream composed by compressing and coding the broadcasting material in the MPEG2 manner to each network station. Each network station operates to insert its own inserting material such as the CM to the transport stream of the broadcasting material. That is, this arrangement makes it possible to organically link the insertion point (splice point) with the inserting material such as the CM and thereby dynamically schedule transmission of the inserting material such as the CM. Further, the inserting material such as the CM may be shared with the MPEG2-system transport stream. Moreover, since the inserting time of each material may be grasped in advance, it is possible to transmit the necessary inserting material from the inserting material server (or the CM server on the transport stream and switch one CM material to another one within the inserting period of the CM. If a transmission error such as a burst takes place around the splice point, by detecting the next PSI, the match between both of the materials spliced at the splice point may be recovered. The transport streams of plural inserting materials such as the CMs generated in advance have their own PIDs. However, this arrangement makes it possible to replace the PID of the inserting material with the PID of the broadcasting material in inserting the inserting material and properly combine the inserting material into the broadcasting material. It means that no PMT is required. Those functions guarantee that the receiving decoder inputted with the stream with the inserting materials being inserted may be properly operated.

According to the present invention, by describing the inserting point and the information about the inserting material on the bit stream of the transmission format, it is possible to grasp the insertive image material and the inserting location when inserting another image material on the bit stream of the transmission format. Hence, the network station enables to easily insert its own inserting material into the transport stream of the broadcasting material composed by compressing and coding the broadcasting material transmitted in real time from the broadcasting station in the MPEG2 manner.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for supplying an image material, taking the steps of compressing and coding the image material, generating a coded bit stream meeting a condition requested by a virtual buffer verifier, and adding information of a splice point when splicing said coded bit stream, comprising the steps of:

compressing and coding said image material in accordance with a fixed quantization step to generate a number of compressed data bits; and compressing and coding said image material of said image material compressed and coded in accordance with said fixed quantization step, in accordance with a variable quantization step selected based at least in part upon said generated number of compressed data bits, to generate a coded bit stream so that said virtual buffer verifier is made to have a target buffer occupancy at said slice point.

2. The method as claimed in claim 1, further comprising the step of storing plural coded bit streams generated by compressing and coding plural image materials at said second compressing and coding step.

3. The method as claimed in claim 2, further comprising the step of splicing the coded bit streams of plural image materials stored at said storing step in any combination.

4. The method as claimed in claim 3, wherein said splicing step contains insertion of said coded bit streams spliced in combination into another coded bit stream.

5. An apparatus for supplying an image material, for supplying a coded bit stream of a specific transmission format composed by compressing and coding said image material in accordance with a fixed quantization means to generate a number of compressed data bits, and compressing and coding said image material of said image material compressed and coded in accordance with said fixed quantization means, in accordance with a variable quantization means selected based at least in part upon said generated number of compressed data bits, comprising:

means for detecting an insertion point for indicating a location where said image material is to be inserted; and means for inserting said image material into a section indicated by said insertion point on the coded bit stream of said specific transmission format.

6. The apparatus as claimed in claim 5, wherein said insertion point contains at least an attribute, a number, and an inserting section length of said image material.

7. A method for supplying an image material, for supplying a bit stream of a specific transmission format composed by compressing and coding image material in accordance with a fixed quantization step to generate a number of compressed data bits, and compressing and coding said image material of said image material compressed and coded in accordance with said fixed quantization step, in accordance with a variable quantization step selected based at least in part upon said generated number of compressed data bits, comprising the steps of:

detecting an insertion point indicating a location where said image material is to be inserted; and inserting said image material into a section indicated by said insertion point on the coded bit stream of said specific transmission format.

8. The apparatus as claimed in claim 7, wherein said insertion point contains at least an attribute, a number and an inserting section length of said image material.

9. The method as claimed in claim 5, further comprising the steps of determining said insertion point on the predetermined in and out points of insertion and specifying a splice point at a given unit for indicating a delimiting point of decoding, placing the head of the coded bit stream of said specific transmission format corresponding to said in and out points at the head of said completed given unit, describing a time reference value at said insertion point for indicating said in and out points, and securing an area for describing said insertion point and said time reference value on the coded bit stream.

10. A method for inserting an image material, for inserting another image material to a coded bit stream of a specific transmission format transmitted in the state of compressing and coding an image material in accordance with a fixed quantization step to generate a number of compressed data bits, and compressing and coding said image material of said image material compressed and coded in accordance with said fixed quantization step, in accordance with a variable quantization step selected based at least in part upon said generated number of compressed data bits, comprising the steps:

detecting an insertion point and information about an insertion material from the coded bit stream of the specific transmission format, said insertion point indicating a location where said image material is to be inserted;

inserting said image material into a section indicated by said insertion point;

storing an inserting material composed of other image materials; and taking out an inserting material corresponding to said information about the inserting material from said stored inserting material; and inserting said inserting material into the section indicated by said insertion point of the coded bit stream of said specific transmission format.

11. The method as claimed in claim 10, wherein said insertion point contains at least an attribute, a number and an inserting section length of said image material.

12. The method as claimed in claim 10, wherein said image material is composed of the coded bit stream of a specific transmission format composed by compressing and coding another image material, and in the case of insertion, the bit stream of the specific transmission format of said image material is made to have the same type of the bit stream of the specific transmission format being transmitted.

13. A method for supplying an image material, taking the steps of compressing and coding the image material, generating a coded bit stream meeting a condition requested by a virtual buffer verifier, and adding information of a splice point when splicing said coded bit stream, comprising the steps of:

compressing and coding said image material;

compressing and coding the same image material as said image material compressed and coded at said first step;

controlling a bit rate of a coded bit stream composed by compressing and coding said image material, for said second compressing and coding step, based on the information about an occurrence amount of bits derived as a result of compressing and coding at said first compressing and coding step and controlling generation of said coded bit stream so that said virtual buffer verifier is made to have a target buffer occupancy at said slice point; and storing plural coded bit streams generated by compressing and coding plural image materials at said second compressing and coding step.

14. The method as claimed in claim 13, further comprising the step of splicing the coded bit streams of plural image materials at said storing step in any combination.

15. The method as claimed in claim 14, wherein said splicing step contains insertion of said coded bit streams spliced in combination into another coded bit stream.

* * * * *